Sept. 7, 1954  A. L. HAYNES ET AL  2,688,258
POWER STEERING MECHANISM
Filed April 17, 1952  2 Sheets-Sheet 1

A.L. HAYNES
W.A. VAN WICKLIN, JR.
INVENTOR.

BY
ATTORNEYS

Sept. 7, 1954  A. L. HAYNES ET AL  2,688,258
POWER STEERING MECHANISM
Filed April 17, 1952  2 Sheets-Sheet 2
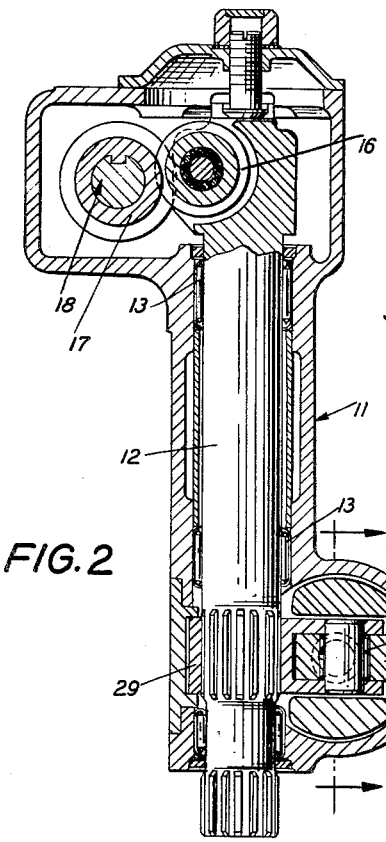
FIG. 2
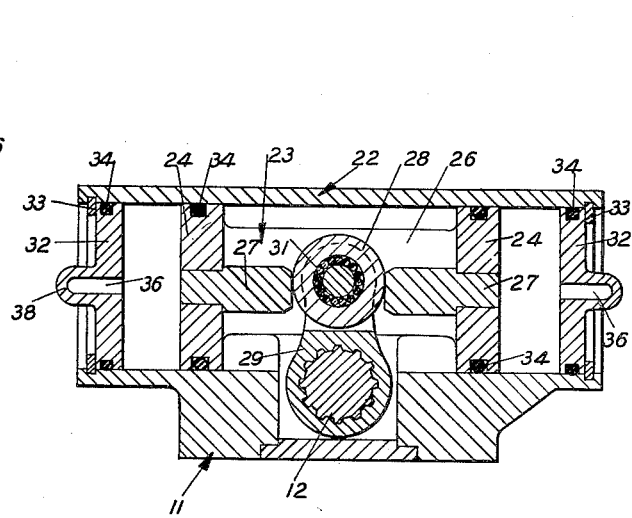
FIG. 4
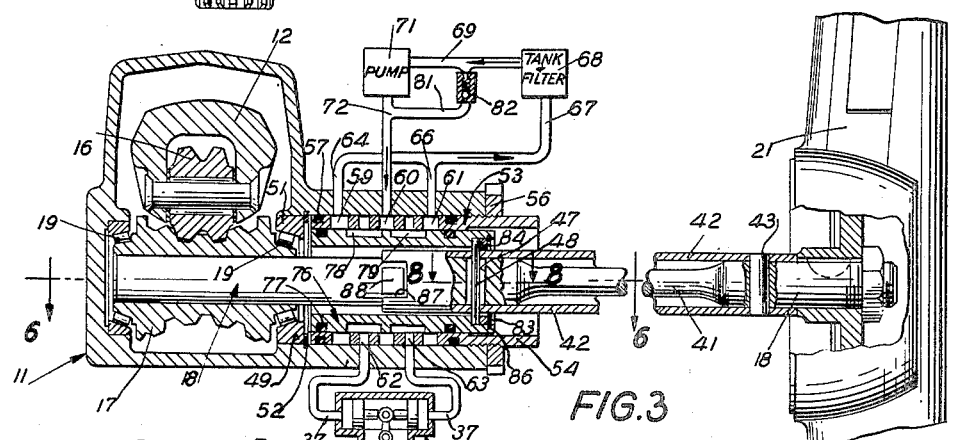
FIG. 3
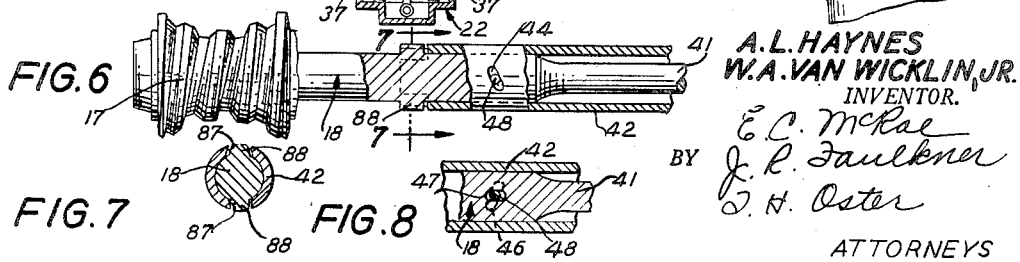
FIG. 6
FIG. 7
FIG. 8
A. L. HAYNES
W. A. VAN WICKLIN, JR.
INVENTOR.
BY E. C. McRae
J. R. Faulkner
J. H. Oster
ATTORNEYS Patented Sept. 7, 1954

2,688,258

UNITED STATES PATENT OFFICE 2,688,258

POWER STEERING MECHANISM

Alex L. Haynes, Detroit, and Warren A. Van Wicklin, Jr., Dearborn, Mich., assignors to Ford Motor Company, Dearborn, Mich., a corporation of Delaware Application April 17, 1952, Serial No. 282,784

7 Claims. (Cl. 74—388)

This invention relates generally to power steering mechanism, and has particular reference to a steering mechanism in which the manual steering effort is augmented by a hydraulic power unit whenever the steering load exceeds a predetermined amount.

An object of the present invention is to provide a power steering mechanism in which hydraulic control mechanism for a hydraulic servo unit is incorporated in the steering mechanism housing and is directly actuated by means of a control member which in turn is actuated by the torsional deflection of the steering post under load. In the present instance this is accomplished by means of a hydraulic power cylinder or servo unit operatively connected to the steering shaft which carries the steering pitman arm. The hydraulic servo unit is connected to a power source and controlled by means of a hydraulic spool valve mounted in the steering gear housing and concentrically surrounding the steering post intermediate the ends of the latter. One end of the post is connected to the steering wheel while the opposite end carries a worm meshing with the worm wheel carried by the steering shaft. Intermediate its ends, the steering post is reduced in diameter so as to provide for torsional deflection under load. An operating sleeve surrounds the steering post, being secured to the post at its upper end adjacent the steering wheel, and being arranged for free rotation relative to the post adjacent its lower end. The steering post and sleeve are formed with intersecting relatively inclined slots through which a pin extends, with the protruding ends of the pin secured to the valve spool so that relative angular movement between the steering post and the sleeve results in axial movement of the pin and the valve spool. This axial movement controls the flow of fluid to the opposite ends of the servo unit to furnish power to the steering shaft and pitman arm when required.

Still another object is to provide cooperating abutment means between the steering post and sleeve, with a predetermined circumferential clearance left therebetween, so that in the event of failure of the hydraulic mechanism steering effort may be transmitted through the sleeve to the worm gear to provide for manual operation and to limit the relative angular deflection between the post and sleeve.

A still further object of the invention is to provide power steering mechanism which is compact and relatively inexpensive to manufacture and assemble, and which does not require extensive changes in the conventional type of steering mechanism. The mechanism embodies the desired advantages of feel, reversibility and absence of appreciable backlash. The mechanism permits steering under normal circumstances to be accomplished without power assistance with no change in the backlash or response from that of the usual manual system, while at the same time automatically providing power assistance when steering loads require. Road reaction is transmitted to the steering wheel in the normal manner but is limited to a maximum value.

Other objects and advantages of this invention will be made more apparent as this description proceeds, particularly when considered in connection with the accompanying drawings, in which:

Figure 2 is a vertical cross-sectional view taken on the plane indicated by the line 2—2 of Figure 1.

Figure 3 is a longitudinal cross-sectional view taken on the plane indicated by the line 3—3 of Figure 1, and in addition showing a portion of the steering wheel, with the hydraulic circuit shown in diagrammatic form.

Figure 4 is a cross-sectional view taken on the plane indicated by the line 4—4 of Figure 1.

Figure 6 is a cross-sectional view, partly in elevation, taken on the plane indicated by the line 6—6 of Figure 3.

Figure 7 is a cross-sectional view taken on the plane indicated by the line 7—7 of Figure 6.

Figure 8 is a fragmentary cross-sectional view taken on the plane indicated by the line 8—8 of Figure 3.

Figures 1, 5:
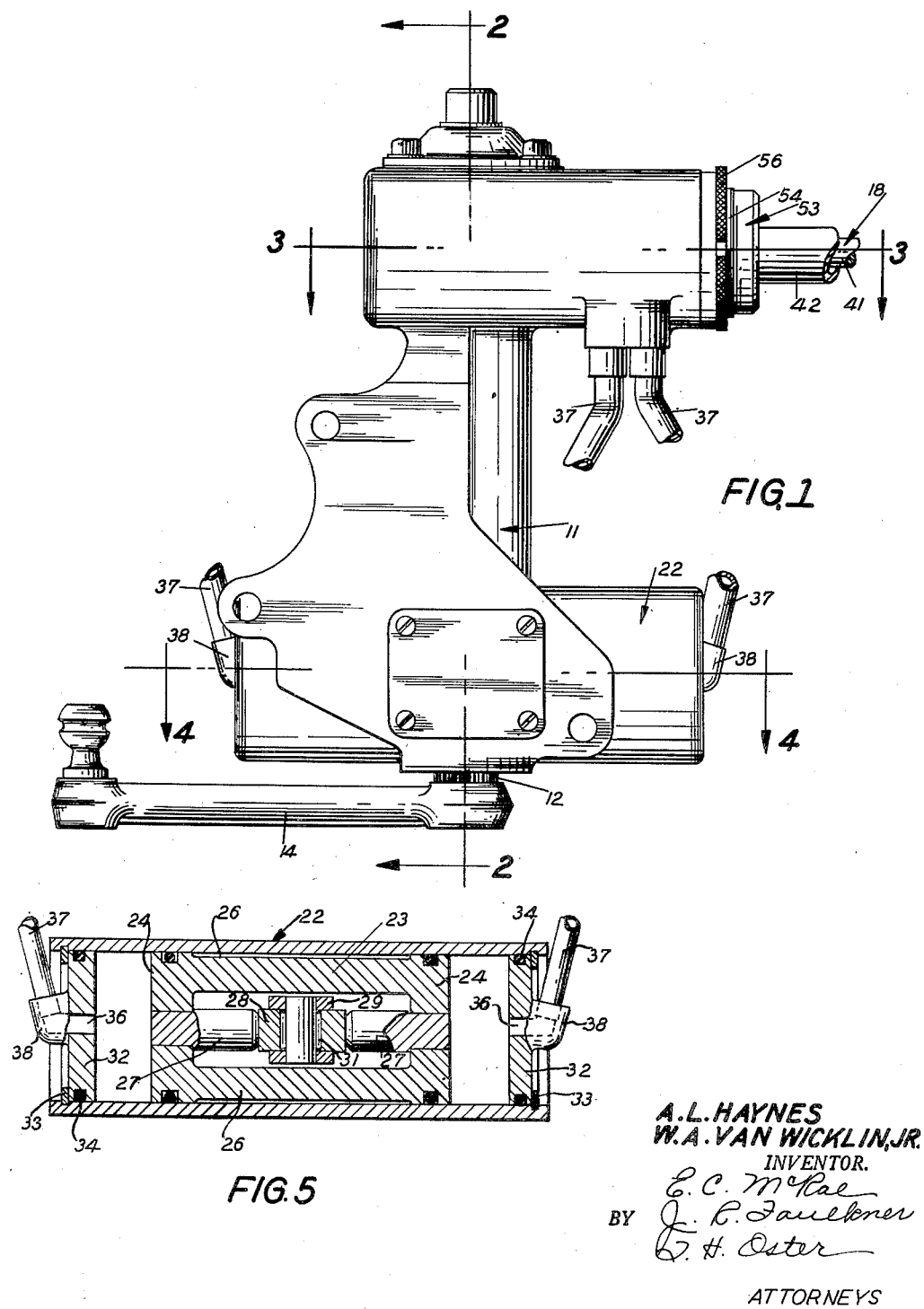
Figure 1 is a side elevational view of the power steering mechanism of the present invention.
Figure 5 is a vertical cross-sectional view taken on the plane indicated by the line 5—5 of Figure 2.

Referring now more particularly to the drawings, the reference character 11 indicates the housing of the steering mechanism of the present invention. Supported within the housing 11 is a generally vertical steering shaft 12, rotatably mounted therein by means of bearings 13. A conventional pitman arm 14 is splined to the lower end of the steering shaft 12 and is connected by conventional linkage (not shown) to the steerable front wheels of a motor vehicle. At its upper end the steering shaft 12 rotatably supports a worm wheel 16 which in turn meshes with a worm 17 mounted upon the lower end of a steering post 18 extending generally at right angles to the steering shaft 12. The worm wheel 17 is rotatably mounted in the housing 11 by means of anti-friction bearings 19. At its upper end the steering post 18 is keyed to a steering wheel 21.

The mechanism thus far described is conventional and is commonly used in manual steering gear mechanisms. For the purpose of providing power assistance to the steering mechanism, the housing 11 is formed with an integral cylinder 22 extending generally at right angles to the steering shaft 12 adjacent the lower end of the latter. Reciprocally mounted within the cylinder 22 is a piston 23 having spaced piston heads 24 interconnected by means of axially extending struts 26. Pins 27 extend inwardly from the piston heads 24 and engage opposite sides of a roller 28 rotatably mounted upon the end of a crank arm 29 by means of bearings 31. The crank arm 29 is splined to the steering shaft 12 intermediate the connections of the latter to the pitman arm 14 and the worm wheel 16.

For simplicity of manufacture and assembly, the integral cylinder 22 is formed with open ends which are closed by cylinder heads 32 held in place by retaining rings 33. Leakage is prevented by means of O rings 34 mounted in peripheral grooves in the cylinder heads 32. As best seen in Figure 5, the cylinder heads 32 are formed with axial passages 36 communicating with conduits 37 connected to the enlarged extensions 38 of the cylinder heads. It will be apparent that when fluid pressure is supplied to one end of the cylinder 22 the piston 23 will be moved axially, rotating the crank arm 29 and consequently the steering shaft 12 to provide power assistance to the latter.

The invention incorporates compact and simplified means for controlling the supply of fluid pressure to the double acting cylinder 22 in accordance with the requirements of the steering load, so as to bring the power unit into operation to assist manual steering when the load exceeds a predetermined amount. Referring now particularly to Figure 3, it will be noted that the steering post 18 has an intermediate portion 41 which is reduced in diameter so as to increase its ability to torsionally deflect under load. This torsional deflection is utilized to actuate a hydraulic valve which in turn controls the double acting hydraulic cylinder and piston assembly.

Concentrically surrounding the steering post 18 between the connections of the latter to the worm 17 and steering wheel 21 is a control sleeve 42. The sleeve 42 is connected to the upper end of the steering post 18 by means of a pin 43 so as to insure simultaneous rotative movement of the upper portions of the post and sleeve. Adjacent its lower end the control sleeve 42 is formed with inclined slots 44 and 46 on opposite sides thereof. An examination of Figures 6 and 8 will show that the slots 44 and 46 on opposite sides of the control sleeve are oppositely inclined with respect to each other, and are each inclined with respect to a plane normal to the axis of the sleeve. The steering post 41 is also provided with an elongated slot 47 extending axially and intersecting the slots 44 and 46.

A pin 48 extends through the slots 44, 46 and 47 in the sleeve and post, and extends beyond opposite sides of the sleeve. It will be apparent that the construction is such that any relative rotation between the lower ends of steering post 18 and the control sleeve 42 will result in an axial movement of the pin 48 by reason of the relatively inclined slots 44, 46 and 47. The control sleeve 42 is relatively rigid whereas the steering post 18 with its reduced section 41 is adapted to be torsionally distorted under load. The steering post 18 is constructed so that under normal steering conditions, such as in straight ahead driving, the post torsionally distorts very little. When, however, a greater steering load is imposed, as for example during turning or parking or when road obstacles are encountered by the tires, the reduced portion of the steering post torsionally distorts a material amount. Its torsional deflection relative to the rigid control sleeve 42 results in axial movement of the pin 48.

With reference to Figure 3, the steering mechanism housing 11 is provided with an enlarged bore 49 of a diameter sufficient to permit the worm gear 17 to be inserted therethrough into position in mesh with the worm wheel 16. An outer bearing ring 51 is then inserted in the bore 49 and is held in place by a retaining ring 52. Next, a valve sleeve 53 is inserted into the bore 49 in the housing, and is properly located axially and held in its assembled position by means of a threaded end portion 54 engaging a correspondingly threaded portion of the housing. A lock ring 56 locks the valve sleeve 53 against inadvertent axial displacement.

The valve sleeve 53 is provided with O ring seals 57 adjacent each end thereof to prevent leakage. The valve sleeve is also provided with a series of ports 59, 60, 61, 62 and 63 formed therethrough.

The ports 59 and 61 communicate with conduits 64 and 66 respectively (shown diagrammatically) which in turn join with each other in a common return conduit 67. The conduit 67 feeds into a reservoir tank and filter unit 68, the latter communicating by means of a conduit 69 with a pump 71. The pump 71 may be of any convenient type and may be driven as desired either from engine components or from a separate electric power source. The output of the pump 71 is supplied through a supply conduit 72 to the central port 60 of the valve sleeve 53.

The ports 62 and 63 of the valve sleeve 53 communicate by means of conduits 37 with opposite ends of the cylinder 22 in the manner shown diagrammatically in Figure 3.

Slidably mounted within the valve sleeve 53 is a reciprocable valve spool 76, also provided with O ring seals 77 at opposite ends thereof. The valve spool 76 is formed with a pair of circumferentially extending annular grooves 78 and 79 in its outer periphery. In the neutral position of the valve spool as shown in Figure 3, the land between the annular grooves 78 and 79 is aligned with supply port 60 from the pump 71, but being slightly smaller than the port 60 permits fluid at low pressure to circulate through the system, being returned to the tank and filter unit through the ports 59 and 61, and the passages 64, 66 and 67. A relief valve 82 in bypass conduit 81 limits the pressure to a predetermined maximum when the power unit is operating.

The end of the valve spool 76 is provided with an annular recess 83 receiving the protruding ends of the pin 48, the latter being held in position by means of a washer 84 and a retaining ring 86. It will be apparent from the foregoing that the valve spool 76 will be moved axially with the pin 48 in response to relative angular movement between the steering post 18 and the control sleeve 42.

When the load upon the steering mechanism is sufficient to torsionally deflect the reduced portion 41 of the steering post 18 the resulting relative angular movement between the steering post and the control sleeve will result in an axial movement of the pin 48 in one direction or the other dependent upon whether the steering load is in a right or left turn direction. When this axial movement of the pin 48 and the valve spool 76 connected thereto is sufficient to shift the latter axially enough to close communications between supply port 60 and either annular groove 78 or 79, it will be seen that communication is established from pump 71 to supply conduit 72 and support port 60 to the particular annular groove 78 or 79 in the valve spool and thence to either the port 62 or 63 as the case may be. Fluid pressure is thus supplied to one end of the hydraulic power cylinder 22 and the double headed piston 23 is axially moved therein. This results in angular movement of the crank arm 29 carried by the steering post 12 and the resulting power application augments the manual steering effort. At the same time, the opposite end of the hydraulic power cylinder 22 communicates through the conduit at the opposite end of the cylinder and the corresponding port 62 or 63 in the valve sleeve and thence through either the annular groove 78 or 79 in the valve spool to the return port 59 or 61. The return fluid then returns through conduit 67 through the tank and filter unit 68 and conduit 69 to the pump 71. During power assisted steering the manual effort is still applied through the steering post 18 to the worm wheel so that the driver retains sufficient feel to enable him to properly control the vehicle.

Means are provided to enable heavy steering loads to be applied through the mechanism manually in the event of failure of any portion of the hydraulic system. As best seen in Figures 3 and 7, the inner end of the control sleeve 42 is provided with a pair of diametrically opposed grooves 87. The grooves 87 receive diametrically opposed lugs 88 extending outwardly from and integrally formed upon the steering post 18 adjacent the inner end of the control sleeve 42. It will be noted that the grooves 87 have a greater circumferential dimension than the corresponding circumferential dimension of the lugs 88 so that clearance is provided between opposite ends of the grooves and the adjacent lugs. This clearance is sufficient to permit free relative rotation between the inner end of the control sleeve 42 and the adjacent portion of the steering post to permit the relative torsional movement necessary to control the hydraulic power mechanism. Upon the failure of the hydraulic mechanism, however, the lugs 88 will eventually abut one end of the grooves 87 to enable torque to be transmitted through the relatively rigid control tube 42 to the inner end of the steering post 18 so that heavy steering loads can be manually controlled.

It will be apparent that the degree of power assistance supplied through the hydraulic cylinder 22 is dependent upon steering requirements. A predetermined torsional deflection of the reduced portion 41 of the steering post 18 will result in sufficient axial movement of the valve spool to provide a restricted passage for the supply of fluid pressure to one end of the power cylinder. If the steering load increases and the torsional deflection of the steering post is correspondingly greater, the valve spool will move axially a further amount and increase the opening from the pump to the power cylinder.

It will be understood that the invention is not to be limited to the exact construction shown and described, but that various changes and modifications may be made without departing from the spirit and scope of the invention, as defined in the appended claims.

What is claimed is:

1. In a steering gear mechanism, a steering gear housing, a steering gear member rotatably mounted in said housing, a steering post having one end rotatably mounted in said housing and operatively connected to said member to provide for manual operation of said member, a steering wheel secured to the opposite end of said steering post, a hydraulic servo unit supported upon said housing and operatively connected to said member to provide for power operation of said member, a hydraulic power source, a hydraulic valve spool reciprocably mounted within said housing concentric with and surrounding said steering post, means interconnecting said power source, valve spool and servo unit to enable said servo unit to be controlled by said valve spool, a sleeve between said valve spool and said steering post, said sleeve having a portion contained within said housing and a portion projecting outwardly from said housing, means connecting the outer end of the outwardly projecting portion of said sleeve to said steering post for rotation therewith as a unit, the inner end of said sleeve being mounted for rotative movement relative to said steering post, and means associated with said steering post and said sleeve arranged to be moved axially upon relative rotation between said steering post and the inner end of said sleeve resulting from torsional movement of said steering post under steering loads, said last named means being connected to said valve spool to axially move the latter to actuate said servo unit and apply power to rotate said steering gear member.

2. The structure defined by claim 1 which is further characterized in that said last named means comprises a pin extending through said steering post and the inner end of said sleeve and projecting beyond the opposite sides of said sleeve, means connecting the projecting ends of said pin to said valve spool, said steering post and said sleeve being provided with intersecting slots angularly related to each other through which said pin projects, said angularly related slots axially moving said pin upon relative rotation between said steering post and the inner end of said sleeve.

3. The structure defined by claim 1 which is further characterized in that said last named means comprises a pin extending through said steering post and the inner end of said sleeve and projecting radially outwardly from said sleeve, means connecting the outer ends of said pin to said valve spool, said steering post having an axially extending slot formed therein through which said pin projects, and said sleeve having a pair of slots formed on opposite sides thereof through which said pin projects, the two slots in said sleeve being inclined with respect to the axis of said sleeve with said slots in the sleeve being inclined in opposite directions.

4. The structure defined by claim 1 which is further characterized in that the inner end of said sleeve and the adjacent portion of said steering post are provided with angularly spaced abutments, said abutments being spaced circumferentially from each other a predetermined amount so that a limited relative rotation between said sleeve and said steering post is permitted in each direction after which relative movement the said abutments engage each other preventing further rotation between said sleeve and said steering post and permitting manual operation of said steering mechanism in the event of failure of any portion of the hydraulic power system.

5. In a steering gear mechanism, a steering gear housing, a steering gear member rotatably mounted in said housing, a steering post having one end rotatably mounted in said housing and operatively connected to said member to provide for manual operation of said member, said steering post projecting outwardly from said housing and having an intermediate portion reduced in cross-section to allow torsional twisting of said steering post under steering loads, a steering wheel secured to the outer end of said steering post, a hydraulic servo unit supported upon said housing and operatively connected to said steering gear member to provide for power operation of said member, a hydraulic power source, a ported valve sleeve fixedly mounted within said housing concentrically surrounding said steering post and radially spaced therefrom, an axially movable hydraulic valve spool slidably mounted within said valve sleeve, means interconnecting said power source, servo unit and valve sleeve to enable said servo unit to be controlled by the axial position of said valve spool in said valve sleeve, an elongated sleeve between said valve spool and said steering post, said last mentioned sleeve having an inner end within said housing and an outer end projecting outwardly from said housing and surrounding the reduced portion of said steering post, means connecting the outer end of said sleeve to said steering post near the outer end thereof, the inner end of said sleeve being mounted for relative rotation with respect to the adjacent portion of said steering post, the inner end of said sleeve and the adjacent portion of said steering post having elongated slots extending radially therethrough with said slots intercepting each other and being inclined to each other, a pin extending through the slots in said sleeve and said steering post and having projecting ends secured to said valve spool to move the latter axially upon relative rotation between said steering post and the inner end of said sleeve resulting from torsional twisting of the reduced portion of said steering post relative to said sleeve under steering loads.

6. In a steering gear mechanism, a steering gear housing, a steering gear shaft rotatably mounted in said housing, a steering post rotatably mounted in said housing at right angles to said first mentioned shaft, a gear mounted upon the inner end of said steering post, a second gear mounted upon said steering shaft and meshing with said first mentioned gear, a steering wheel secured to the opposite outer end of said steering post, said steering post having a portion between said first mentioned gear and said steering wheel reduced in diameter to enable said steering post to be torsionally twisted under steering loads, a sleeve surrounding the said intermediate portion of said steering post, means rigidly connecting the outer end of said sleeve to said steering post adjacent the outer end of the latter, a pin projecting diametrically through said steering post and said sleeve intermediate the reduced portion of said steering post and the first mentioned gear on said steering post, said steering post and said sleeve being formed with intercepting slots angularly inclined with respect to each other through which said pin projects, a hydraulic servo unit mounted upon said housing and engageable with said steering shaft to provide for power operation of the latter, a hydraulic pump, hydraulic valve means slidably mounted in said housing concentric with said steering post and said sleeve and surrounding the latter, means establishing communication between said hydraulic pump, servo unit and valve means to actuate said servo unit and said steering shaft upon axial movement of said valve means, and means securing a projecting portion of said pin to said valve means to axially move the latter upon relative torsional movement between said steering post and said sleeve.

7. The structure defined by claim 6 which is further characterized in that the inner end of said sleeve is formed with a circumferentially extending slot, a radially outwardly extending projection upon said steering post received within the slot in said sleeve, the circumferential dimension of said projection on the steering post being smaller than the corresponding dimension of the slot in said sleeve so as to provide clearance therebetween and permit a predetermined relative rotative movement between said steering post and said sleeve, said projection abutting one end of the slot in said sleeve upon a predetermined relative rotation between said sleeve and said steering post to provide for manual operation of said steering gear mechanism in the event of failure of any portion of the hydraulic system.

No references cited.